United States Patent [19]

Jansen et al.

[11] 4,161,959
[45] Jul. 24, 1979

[54] HIGH-TEMPERATURE SLIDE VALVE, ESPECIALLY HOT-BLAST SLIDE VALVE

[75] Inventors: Hermann Jansen; Heinz Schneider, both of Düren, Fed. Rep. of Germany

[73] Assignee: Zimmermann & Jansen GmbH, Düren, Fed. Rep. of Germany

[21] Appl. No.: 678,672

[22] Filed: Apr. 20, 1976

[30] Foreign Application Priority Data

Apr. 23, 1975 [DE] Fed. Rep. of Germany ....... 2518074
Aug. 28, 1975 [DE] Fed. Rep. of Germany ....... 2538357

[51] Int. Cl.² .......................................... F16K 49/00
[52] U.S. Cl. ................................ 137/340; 251/327
[58] Field of Search ............... 137/340, 269; 251/327; 165/47

[56] References Cited

U.S. PATENT DOCUMENTS

| | | | |
|---|---|---|---|
| 1,102,197 | 6/1914 | Knox | 137/340 |
| 2,121,686 | 6/1938 | Currie | 137/340 X |
| 3,552,423 | 1/1971 | Vietorisz | 137/340 |
| 3,941,186 | 3/1976 | Schneider | 137/340 X |

FOREIGN PATENT DOCUMENTS 14295 7/1881 Fed. Rep. of Germany ........... 137/340

Primary Examiner—Irwin C. Cohen
Attorney, Agent, or Firm—Sherman & Shalloway

[57] ABSTRACT

The present invention relates to a high-temperature slide valve, especially hot-blast slide valve, comprising a water-cooled valve casing at least partially lined with refractory material and provided with a pair of end flanges, said casing including coolant passages or channels and, preferably water-cooled, sealing strips or bars as well as a chamber positioned transversely of the longitudinal axis of the flow cross-section of the gas conduit, which chamber has guided therein a slide valve plate for closing and opening said flow cross-section, with an actuating device being removably attached to the one end of said chamber, with the present improvement comprising that the entire center portion of said valve casing enclosing said chamber for said valve plate is formed at all sides thereof with a rectangular configuration and provided with an end wall at the end face opposite the attachment side for said actuating device.

4 Claims, 8 Drawing Figures

HIGH-TEMPERATURE SLIDE VALVE, ESPECIALLY HOT-BLAST SLIDE VALVE

The present invention relates to a high-temperature slide valve, especially hot-blast slide valve, comprising a water-cooled valve casing at least partially lined with refractory material and provided with a pair of end flanges, said casing including coolant passages or channels and, preferably water-cooled, sealing strips or bars as well as a chamber positioned transversely of the longitudinal axis of the flow cross-section of the gas conduit, which chamber has guided therein a slide valve plate for closing and opening said flow cross-section, with an actuating device being removably attached to the one end of said chamber.

Casings for high-temperature slide valves, especially hot-blast slide valves, of the conventional type include at the mounting side of the actuating device of the slide valve plate a box-shaped duct, while they are formed with a substantially circular configuration at the opposite side, namely in conformity to the circular, tubular internal cross-section. Such casing configuration having non-regular contours raises difficulties with respect to controlling the consequently different thermal expansion such that, among other things, a plurality of supporting elements are required at the rounded side of the casing.

Further, high-temperature slide valves of this type always show higher wear of the valve casing or of its components, respectively, at the side where the free end of the valve plate initially opens the flow cross-section of the valve in the opening operation, or closes the last portion of the flow cross-section during the closing operation of the slide valve. Particularly high gas flow velocities are hereby encountered at this location. Therefore, a conventional high-temperature slide valve must be replaced completely as soon as the wear at the abovementioned specific portions becomes too high, such replacement causing not only costly down-time, but also the expenditure of cost for these slide valves having limited operating life due to the particular place of wear.

It is the object of the present invention to avoid these disadvantages and, more particularly, to provide a simplified casing for slide valves subjected to high temperatures, whereby not only the control of great and varying thermal expansion phenomena should be improved and the production of the casing should be facilitated, but whereby also the effect of the extra wear in the region of the free end of the slide valve plate should be adapted to be minimized.

An important object of the invention resides primarily in the provision of a sufficient volume or space below the valve plate to receive even greater fragments, e.g., from the lining of refractory or thermally insulating material of the pipe network or of the slide valve, such that the valve plate is prevented from sticking.

In a casing for high-temperature slide valves, especially hot-blast slide valves, of the type as outlined at the beginning, the present invention resides in that the entire center portion of said valve casing enclosing said chamber for said valve plate is formed at all sides thereof with a rectangular configuration and provided with an end wall at the end face opposite the attachment side for said actuating device. In this embodiment, the two casing box halves positioned above and below the longitudinal plane of the pipe may be formed symmetrically relative to each other. Owing to the box-shaped configuration of the casing center portion, the lower half, i.e., that opposing the actuating device, even may be shorter (or longer) without substantially affecting the control of thermal stresses.

Box-type slide valves have heretofore been used only for constructions which are not, or to a low degree only, subject to thermal stress (compare, e.g., U.S. Pat. Nos. 3,481,580 and 3,415,489; French Pat. No. 2,090,908), and these slide valves could not be constructed as water-cooled slide valves lined with heat insulating material, particularly such of extremely great diameters as in the case of hot-blast slide valves.

According to the present invention, the slide valve casing of the invention has a simple box-shaped configuration only through which a pipe passes, whereby the components of this slide valve can be manufactured with greater ease and are adapted to be connected or welded to each other with less stress and more easily. Hereby, the end wall may be provided, for example, with a great-diameter aperture to provide for the removal of even greater fragments of heat insulating material from the pipeline or from the slide valve, such that the slide valve plate is prevented from sticking. Further, the slide valve casing according to the invention has the advantage that — with the bottom covers being removable — access to the casing is readily possible at any time even from below such that, for instance, the valve plate may be removed or installed even from below.

The last-mentioned advantage results if a flange for selectively mounting or removing said end wall is provided around the outer edge of the one front face of said rectangular center portion of said valve casing.

Furthermore, the casing according to the invention can be lined more easily across long, smooth or planar surfaces, or provided with (pre-fabricated!) insulating panels, respectively, and the insulating layer of the casing is easier to repair. Owing to the fact that the side of the box opposite the mounting side includes a substantially greater volume for the accumulation of dust and even of separate fragments of, e.g., the brick lining, the casing according to the invention also is less susceptible to failure. Finally, in the construction of the valve casing according to the invention, the lower portion of the casing need no longer be cooled, and the actuating device is subjected to lower thermal stress.

Accordingly, an advantageous embodiment of the invention resides in that the center portion of said valve casing on all sides thereof, with the exception of the mounting side for said actuating device, is provided (lined) with a refractory or heat resistant insulating material.

At the same time, the modification of the casing configuration according to the invention also permits a substantial modification of the cooling passages to be made.

Alternatively, the high-temperature slide valve according to the invention may be constructed in such a manner that the chamber has further provided its other (opposite) end with an aperture permitting selective attachment of said actuating device at either end of said chamber, whereby the respective open end is adapted to be closed by means of said end wall or cover means.

A particular feature resides in the fact that the chamber is formed in mirror image fashion relative to a plane of symmetry passing in the direction of the longitudinal axis of said flow cross-section transversely of the longitudinal axis of the chamber.

Consequently, the present slide valve of this type represents a penetration or intersection of a continuous, rectangular chamber by the rest of the circular (tubular) casing of the slide valve.

In this manner, when the specific wear occurs in the high-temperature slide valve according to the invention, it is possible either to simply turn the valve casing over by 180°, or the valve plate and the actuating device may be mounted to the opposite side of the chamber, such that, most conveniently, the free end of the valve plate cooperates with a not worn portion of the sealing strips or of the valve casing, respectively. This possibility virtually doubles the useful life of a high-temperature slide valve according to the invention.

As the valve casing, besides, is fully symmetrical in construction, it can be manufactured more easily, too. Finally, even in locations where installation is difficult, it is possible to mount the valve plate into the valve casing alternatively from the one or the other side. Also, the symmetrical configuration of the slide valve according to the invention improves the control of thermal stresses produced in the valve casing.

On the other hand, an advantageous further development of the invention also resides in the fact that additionally to said coolant passages there are connected with said sealing strips, coolant passages which, arranged on the outside of said center portion, extend peripherally around tubular extensions of said valve casing, whereby the cooling water which first flows through the sealing strips, is communicated with the cooling water outlet. These additional coolant passages which are preferably connected as recirculation cooling passages, serve to cool the casing box from the outer side. In this way, on the one hand the cooling passages or channels are easier to construct, and on the other hand axial installation space is saved.

More particularly, the cooling water supply for the sealing strips of the slide valve and the cooling water outlet may, to this end, be disposed at the attachment side of the actuating device, whereby, preferably, the construction is made such that the cooling water supply for the sealing strips of said slide valve intersects or passes through said additional coolant passages, and that one coolant passage each and an associated additional or auxiliary coolant passage are arranged coaxially to each other across their full extension, whereby said additional coolant passage extends radially outwards of said sealing strips. Hereby the coolant passages for the sealing strips are connected to the additional or auxiliary coolant passages after a full circular extent of the respective sealing strip, i.e., after an angular distance of 360°.

Additionally, the invention provides for improved cooling of the casing because the side walls of the chamber extending parallel to the longitudinal axis of the flow cross-section are water cooled, whereby, specifically, the side walls are each formed as a double-walled structure defining a coolant space between an inner wall and an outer wall, which coolant space has flowing therethrough coolant or water from a coolant connection adjacent the one end of said chamber towards another coolant connection adjacent the opposite end of said chamber. Depending on the relative spacing between these two walls, the flow velocity and the effectivity of the coolant may be adjusted to optimum values most conveniently.

Furthermore, it is hereby possible that the coolant passages of said sealing strips are formed with a cross-section elongate in the axial direction of said slide valve and with rounded corners on all sides thereof, and that a layer of a refractory material is provided between the guiding slot for said valve plate and the radially outwardly disposed cooling (water) or coolant passages of said casing.

Due to the respectively separate coolant connections for the cooling passages and the sealing strips, these elements may each be provided doubly, namely adjacent the two ends of the chamber, advantageously at the longitudinal sides of the chamber.

High cooling efficiency is obtained by forced water cooling whereby those coolant connections for cooling the sealing strips are each connected to the coolant supply which, for example, are located at that end of the chamber where the actuating device is mounted, whereby the coolant connections provided at the respective other end of the chamber are interconnected in such a manner that the coolant is returned from the end of the coolant connections of the sealing strips to the inlet side via the cooling passages or channels.

Extension of this favorable cooling efficiency to three zones is obtained by connecting the respective coolant outlet of the cooling passages to the intake cooling water connections of the side walls.

An additional, favorable positiveness of the water control is obtained according to the invention by dividing the coolant passages for the slide valve seats as well as the cooling passages of the valve casing, longitudinally of the chamber, into a pair of semi-circular sections each, which sections have their separate inlet cooling water connections and outflow cooling water connections.

By having guiding of baffle means provided within the cooling passages upstream of their transition into the coolant connections, which means deflects the coolant along the end wall of the respective semi-circular section, uniform cooling can be obtained also in these flow reversal regions.

Below, the present invention is further described in several embodiments by referring to the drawings in which identical parts are designated by identical reference numerals.

The slide valve casing 2 of a slide valve 1, preferably of a high-temperature slide valve or hot-blast slide valve gate of a blast furnace, is defined in its axial direction by an end flange 3 and 4 each, by means of which flanges the casing 2 is mounted between correspondingly arranged — not illustrated — ends of a gas pipeline, e.g., with the aid of threaded connections.

Figure 2A:
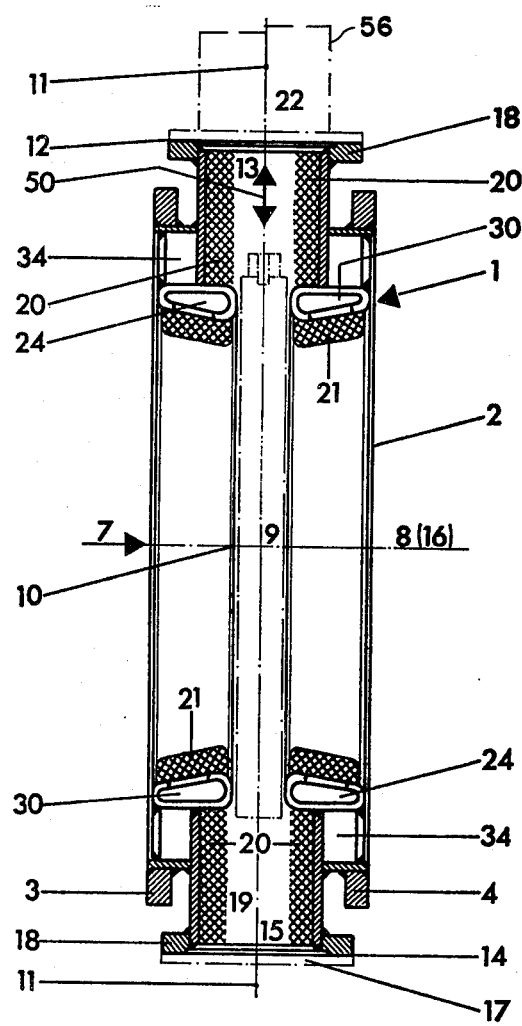
FIG. 2a is a longitudinal sectional view of the present high-temperature slide valve according to FIG. 1.

The free flow cross-section 7 interiorly of the casing 2 is variable by means of a valve plate 9 between a fully closed position (e.g., as shown in FIG. 2a) and a fully open position, such that the slide valve 1 is adapted to be closed or shut off by means of the valve plate 9. Actuation of the valve plate 9 is made by means of a conventional, not separately shown actuating device 56 being removably mounted to mounting flanges 18.

Arranged in circularly symmetrical fashion about the longitudinal axis 8 of the flow cross-section are sealing strips or bars 5 (compare especially FIG. 2b) which are sealingly engaged by the valve plate 9 in the closed position of the slide valve 1. Same as the remaining parts of the casing, these sealing strips 5 may be made of steel, and they have hollow cross-sections 30 defining coolant passages or channels 24 through which water is passed to effect cooling under high thermal loads. Radially inwardly of the sealing strips 5, the casing 2 may be provided with a refractory and heat insulating lining 21.

Figure 2B:
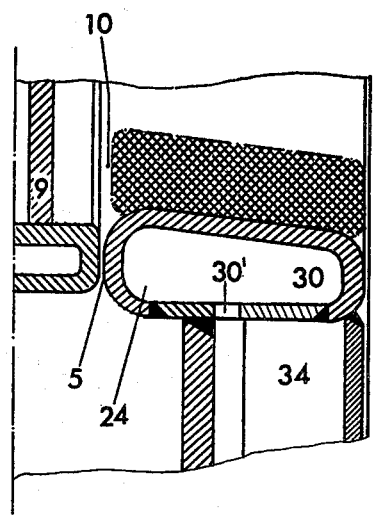
FIG. 2b is an enlarged sectional part view of the encircled portion of FIG. 2a in order to more clearly show the details.

During its opening or closing movements, the valve plate 9 is guided within a guiding slot 19 (FIG. 2a) which is defined by a chamber 10. The chamber 10 has a rectangular cross-section, and it intersects the otherwise substantially circular casing 2 perpendicularly to the longitudinal axis 8 in a sectional plane of the slide valve 1 situated preferably in the center of the axial distance between end flanges 3 and 4, whereby the longitudinal axis 11 of chamber 10 intersects the longitudinal axis 8 in the center of the flow cross-section 7. From this center plane, the chamber 10 extends in axial direction with approximately a width corresponding to the thickness of the valve plate 9 plus at least part of the thickness of sealing strips 5 (FIG. 2b).

Chamber 10 has two (open) ends 12 and 14, each provided with an aperture 13 and 15, respectively, and each having mounting flanges 18 thereon. In the embodiment shown in FIGS. 1 to 3, the configuration of chamber 10 (and of its walls) is completely mirror-symmetrical relative to a plane of symmetry 16 which includes the longitudinal axis 8 extending horizontally through the center section of the free flow cross-section. In this way, valve plate 9 may be actuated either from end 12 or from end 14, to which effect the valve plate 9 is simply reversed upside down and inserted into the respective other end. Then, the actuating device 56 including a slide valve hood 22 (not shown in greater detail) may be attached to the associated mounting flange 18 at the respective actuating side. The opposite end 12 or 14, respectively, (end 14 according to FIG. 2a) is closed by a removable casing cover 17.

Interiorly of the portions of the longitudinal sides 46 of chamber 10 which are disposed (axially) outwards of sealing strips 5, a layer 20 of a refractory and heat insulating material may be mounted. The side walls 40 defining chamber 10 at its other, narrower side are of double-wall construction comprising an inner wall 41 and an outer wall 42 such that a coolant space 43 is formed therebetween which space, depending on the desired cooling efficiency, may be formed conveniently with a greater or smaller width.

The coolant passages 24 extending through sealing strips 5 are each formed as semi-circular sections 25 and 26, whereby they are divided into a pair of segments by an end wall 27. Sections 25 and 26 each include separate coolant connections 28 and 29, respectively, namely at both ends 12 and 14 of chamber 10. Through these connections, cooling water from a coolant supply 47 enters the slide valve 1 and is returned to the input end by coolant passages or channels 34. These coolant passages 34, too, include separate coolant connections 38 and 39, again at both ends 12 and 14, respectively, of chamber 10. An end wall 37 divides coolant passages 34 into semi-circular sections 35 and 36 each.

Figure 1:
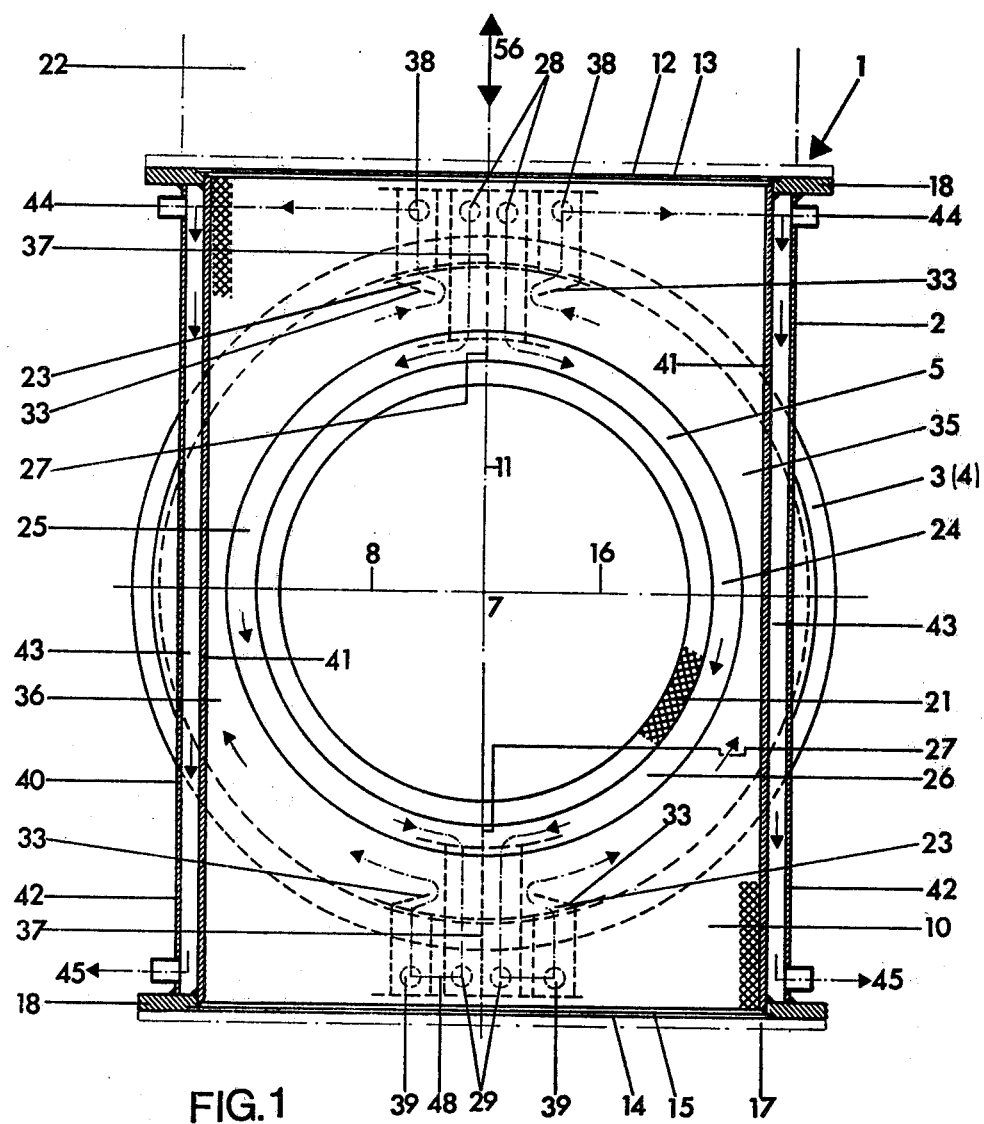
FIG. 1 is a cross-sectional view of a high-temperature slide valve according to the invention.
Figure 3:
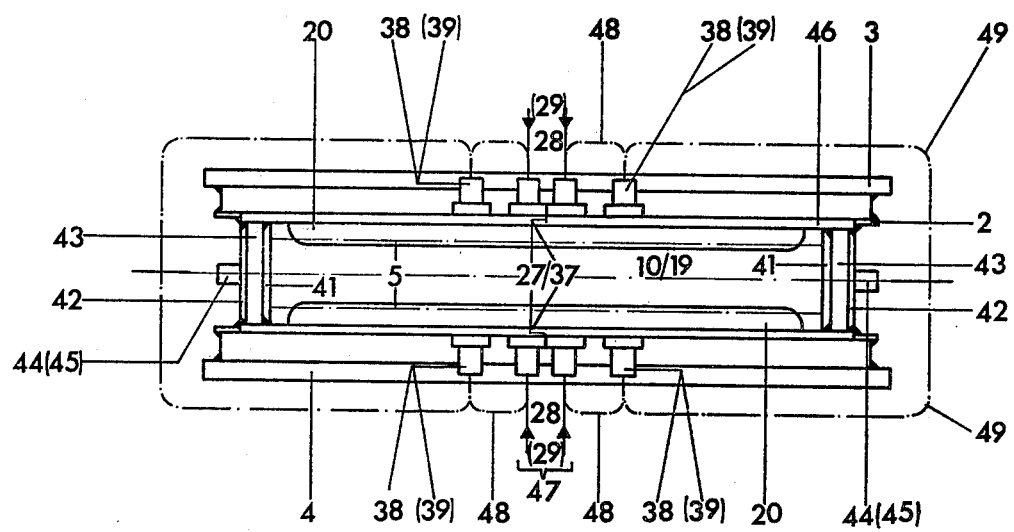
FIG. 3 is a plan view of the present high-temperature slide valve according to FIG. 1 with the mounting means omitted and schematically showing the cooling flow connections between the individual coolant connections of each of the three cooling zones.

In the position of the casing cover 22 as shown in FIGS. 1 and 3 (at the end 12), the cooling water flows through coolant connections 28 and through the semi-circular sections 25 and 26 to coolant connections 29 where it is communicated with coolant connections 39 via selectively removable connections or conduits 48. At guiding or baffle means 33 in the transition 23 to the semi-circular sections 38 and 39 of cooling passages 34, the cooling water is turbulently directed against end wall 37 and returned to the cooling water connections 38. From these connections 38, the cooling water flows, via a selectively removable connection or conduit 49, to coolant connection 44 for the coolant space 43 to cool side walls 40 of chamber 10, from which chamber the cooling water ultimately exits through coolant connection 45 to be discharged.

If the actuating device 56 is attached to the opposite side of chamber 10, i.e., at end 14, the cooling water enters through coolant connections 29 while it is discharged through coolant connection 44, whereby the complete construction according to FIGS. 1 to 3 is made in mirror image fashion relative to the plane of symmetry 16 and connections 48, 49 may be rearranged, if desired. Accordingly, the valve plate 9 may be installed from end 12 or from end 14, as required, whereby no further essential modifications of the slide valve 1 need be made.

As shown in FIGS. 2b, the coolant passages 24 are formed with a rounded cross-section, and the sealing strips 5 are preferably formed as profiled (section) weld construction, with an enlargement of the cross-section towards valve plate 9 being provided. The transition from the coolant passages 24 into coolant passages 34 takes place in each case through apertures 30'.

The valve casing 2 of the embodiment according to FIGS. 4 to 7, similarly as that according to FIGS. 1 to 3, has a box-shaped profile or cross-section. The box-shaped portion 60, being rectangular at every side thereof, has its flat faces 53 likewise intersected perpendicularly thereto by the flow cross-section of the gas pipeline into which the high-temperature slide valve 1 is connected. End flanges 3 and 4 are mounted to nozzle-shaped extensions 52. Arrow 50 indicates the direction in which the not illustrated valve plate is adapted to be inserted only from the upper side A of the center box-shaped portion 60, the flange 18 of which has removably mounted thereto the actuating device. A sealing or gasket groove 18a may be provided for sealing purposes. Normally, the valve plate even in its fully closed position does not extend far into the lower portion 10a of chamber 10 such that loosened solid particles and the like may accumulate in this lower portion, which particles may be discharged through a cleaning nozzle 54 (FIGS. 4 and 5) adapted to be opened.

Figure 4:
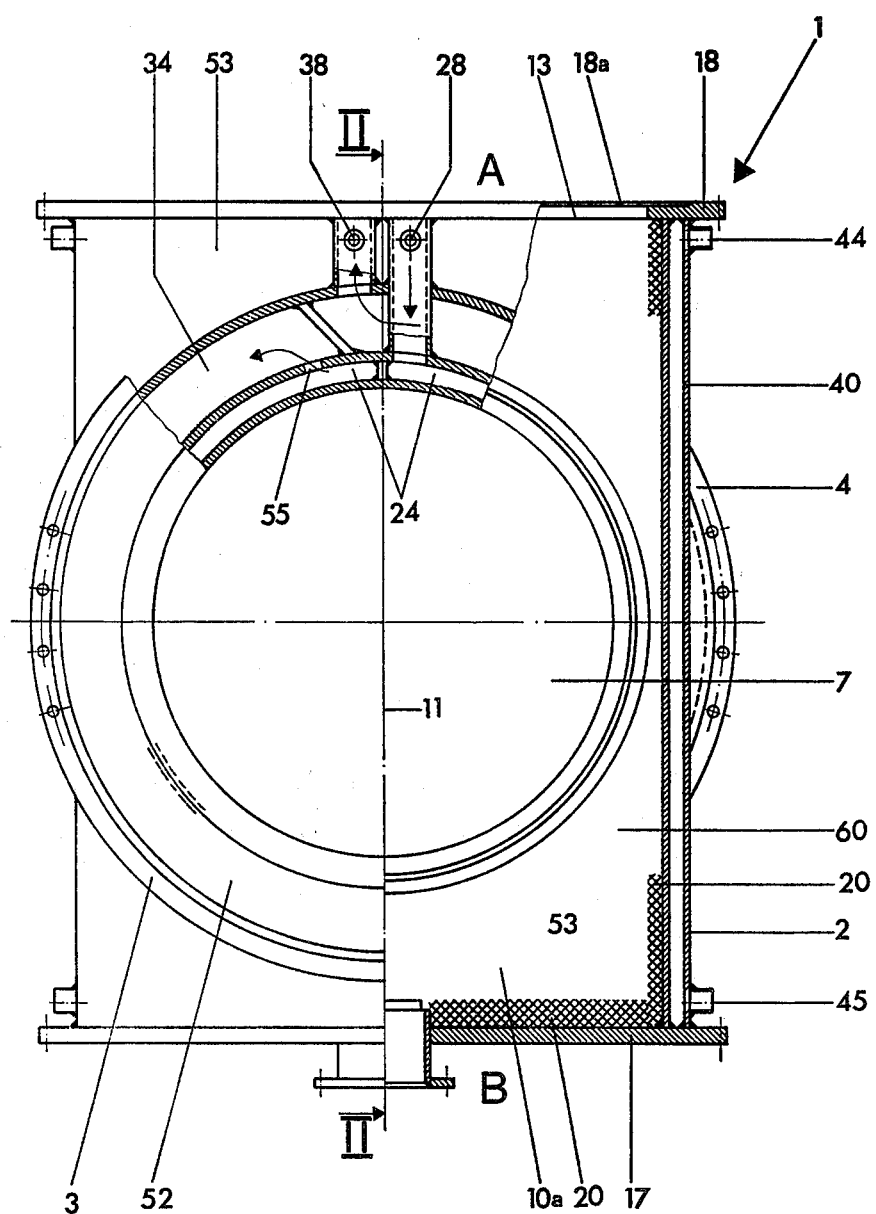
FIG. 4 is a partly broken side elevational view of the casing according to the invention, as seen in the direction of the longitudinal pipe axis and with the valve plate and its acutating device being omitted.
Figure 5:
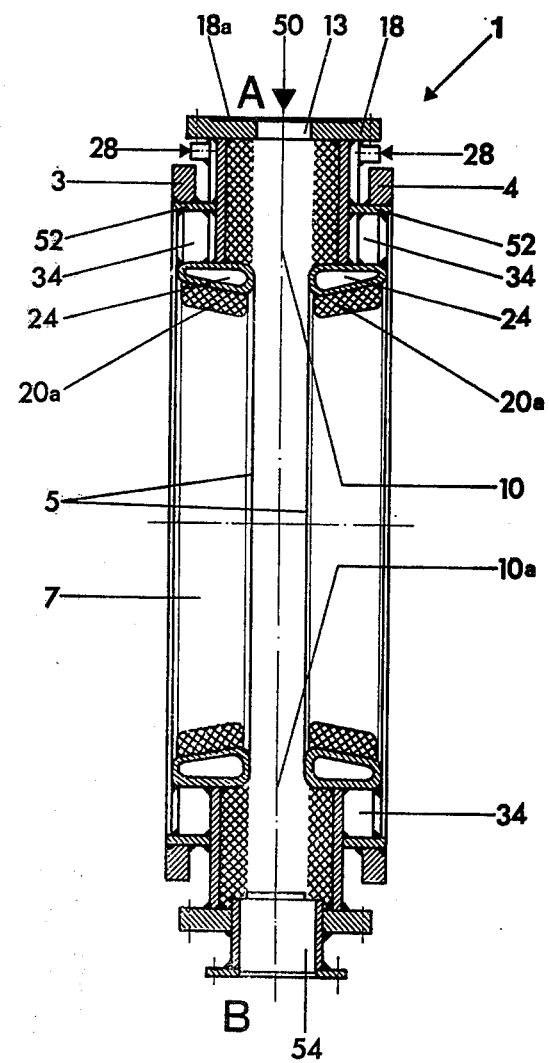
FIG. 5 is a section along lines II—II of FIG. 4 through the casing.

This cleaning nozzle 54 is secured to the end wall 17 which according to FIGS. 4 and 5 is securely attached to the lower wide side so as to form the bottom of chamber 10 or to define the lower portion 10a thereof, respectively, at bottom side B opposite from upper side or top A.

Figure 6:
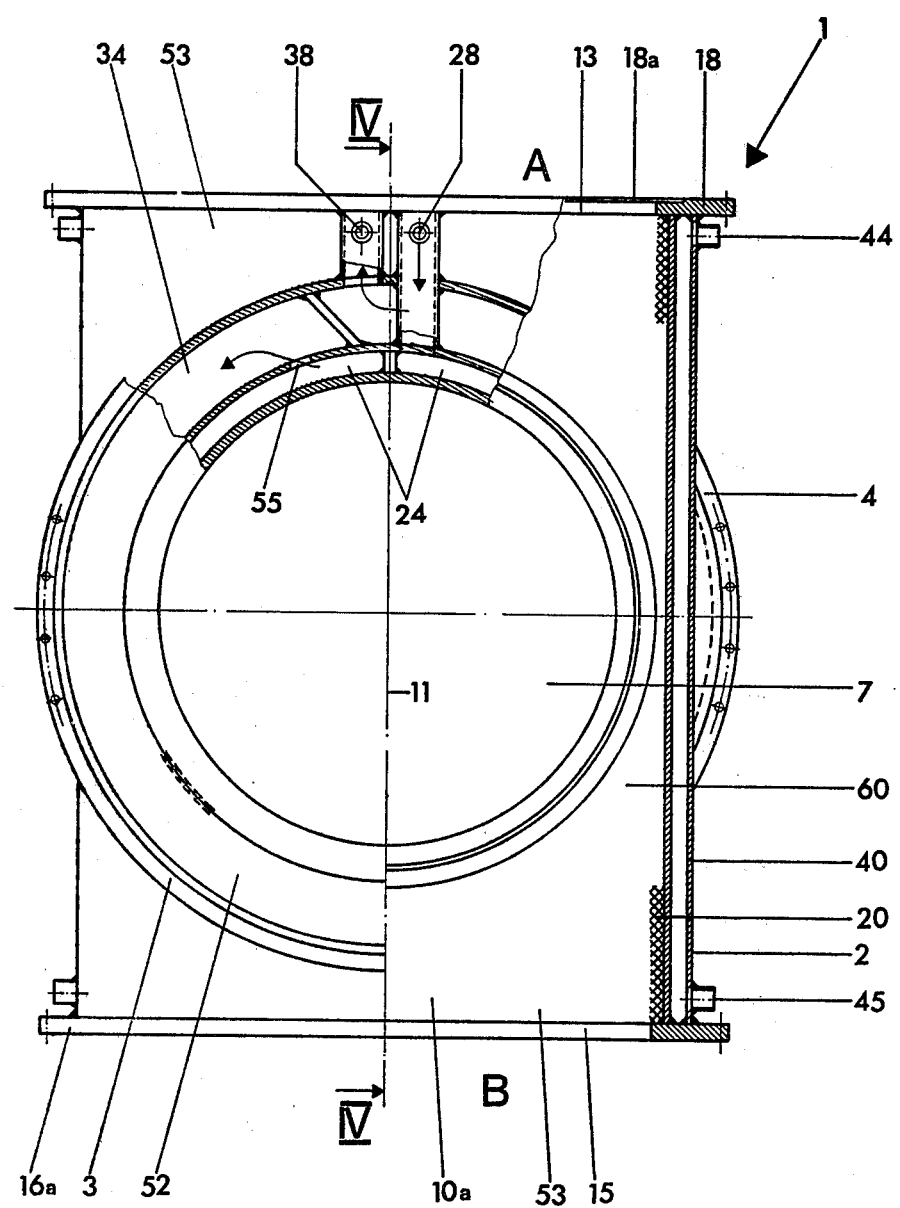
FIG. 6 is a view of a slightly modified embodiment of the casing according to FIG. 4.
Figure 7:
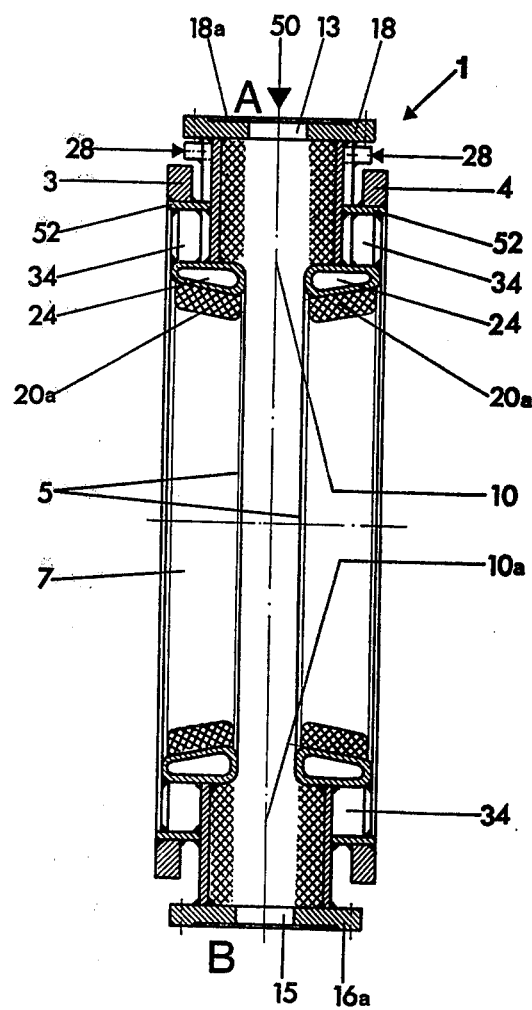
FIG. 7 is a section along lines IV—IV of FIG. 6 through the casing.

As shown in FIGS. 6 and 7, this end wall 17 for aperture 15 also may be removably secured to lower flanges 16a which may not be provided with special sealing grooves 18a (as in flange 18) in their exposed upper face 16a.

The flow cross-section (conduit) 7 may be provided with a heat resistant or refractory insulating material 20a, and the inner face of the center portion 60 may be lined with a layer 20 of a refractory insulating material (with the exception of aperture 13).

The side walls, especially side walls 40, are of double-walled structure including water inlet nozzles 44 and water outlet nozzles 45, such that the side walls are adapted to be cooled. Interiorly of the double-walled structure, the cooling water may be conducted in preferred paths by means of guides or baffles.

Coolant is fed to the coolant passages 24 from a coolant supply 28 through interconnecting passages (in the direction of the arrow), which interconnecting passages extend or pass through the additional coolant passages 34. The coolant (water) first flows through one sealing strip 5 each or its coolant passage 24 over 360° whereupon the coolant enters the radially outwardly disposed additional coolant passages 34 through a transition aperture 55. Through these coolant passages 34, the coolant returns over an angular extent of 360° (arrows in FIGS. 4 and 6) to the coolant outlet 38. The arrangement of the coolant connections 28 and 38 at the top A of the casing is preferred, but these connections may be arranged also in any other expedient manner.

Alternatively, coolant circulation can be effected also in such manner that the coolant passages 24 are subdivided into semi-circular segments, such that the inlet is positioned on top A and the water is passed at both sides in semi-circular fashion around the pipeline cross-section, with the water flowing at the lower side into the additional coolant passages 34 (likewise divided into semi-circular segments) to be returned by these passages to the upper side and passed to the cooling water outlet 38. Furthermore, the cooling water outlet or discharge nozzles 38 also may be connected to the water inlet nozzle 44 so as to form an extended cooling water circulation system.

What we claim is:

1. A high-temperature slide valve, especially hot-blast slide valve, comprising:
   (a) a water cooled valve casing having a flow cross-section with a longitudinal axis provided with a pair of end flanges, said casing including coolant passages;
   (b) circular, hollow, tubular sealing strips positioned in the casing;
   (c) said valve casing defining a chamber positioned transversely of the longitudinal axis of the flow cross-section of the valve casing, said chamber having therein a slide valve plate for closing and opening said flow cross-section, said sealing strips having arcuate outer surfaces slideably and sealingly engaging the plate for sealing said casing to the plate;
   (d) an actuating device controlling said valve plate position being removably attached to said casing at one end of said chamber;
   (e) a center portion (60) of said valve casing enclosing said chamber (10) for said valve plate (9) with a rectangular configuration having side walls and upper and lower walls (17 and 18) for selective attachment of said actuating device, each of said upper and lower walls having an opening therethrough, one of said openings being open for positioning of the actuating device therethrough and the other of said openings being blocked by a closure means;
   (f) refractory material lining the sidewalls (40) of said chamber (10);
   (g) said coolant passages comprising first and second opposing, concentric, semi-circular sections (25 and 26) having first and second inlets (28) and first and second outlets (29), respectively, said first and second sections located around the flow cross-sections and formed within the hollow of said sealing strips (5);
   (h) third and fourth opposing, concentric, semi-circular sections (35 and 36) having third and fourth inlets (39) and third and fourth outlets (38), respectively, said third and fourth sections being defined by said casing and disposed radially outward of and concentric with said first and second sections;
   (i) a plurality of sidewall cooling sections formed by double wall sections of which said sidewalls form one wall thereof (43) having sidewall inlets (44) and sidewall outlets (45), said sidewall sections located between said end flanges and generally perpendicular to said semi-circular sections;
   (j) said first and second outlets having means for selective normal connection to said third and fourth inlets; and
   (k) said third and fourth outlets having means for selective normal connection to said sidewall inlets.

2. The high-temperature slide valve according to claim 1, characterized in that the cooling water supply (28) for the sealing strips (5) of the slide valve and the third and fourth outlets (38) are provided on the mounting side of said actuating device (56).

3. The high-temperature slide valve according to claim 1, characterized in that said coolant connections (28, 29, or 38, 39) are positioned at the sides (46) of said chamber (10).

4. The high-temperature slide valve according to claim 1, characterized in that baffle means (33) are provided within said coolant passages (34), said baffle means deflecting said coolant along a respective semi-circular section (35, 36).

* * * * *